United States Patent [19]

Chamuel

[11] 4,144,574
[45] Mar. 13, 1979

[54] MULTI-AXIS POSITION DETERMINING SYSTEM

[75] Inventor: Jacques R. Chamuel, Allston, Mass.

[73] Assignee: The Charles Stark Draper Laboratory, Inc., Cambridge, Mass.

[21] Appl. No.: 842,053

[22] Filed: Oct. 14, 1977

[51] Int. Cl.² ............................ G01S 3/80; G01S 5/18
[52] U.S. Cl. .................................... 364/561; 324/208;
340/16 P; 364/449
[58] Field of Search ............... 364/449, 559, 453, 560,
364/561; 340/16 R; 324/207, 208

[56] References Cited

U.S. PATENT DOCUMENTS

| | | | |
|---|---|---|---|
| 3,121,955 | 2/1964 | King | 340/16 P |
| 3,156,766 | 11/1964 | Stamps | 340/16 R |
| 3,423,673 | 1/1969 | Bailey et al. | 324/208 |
| 3,898,555 | 8/1975 | Tellerman | 324/208 |
| 4,028,619 | 6/1977 | Edwards | 324/208 |
| 4,071,818 | 1/1978 | Krisst | 324/208 |

Primary Examiner—Felix D. Gruber
Attorney, Agent, or Firm—Robert F. O'Connell

[57] ABSTRACT

A position determining device having a distributed sensing element, such as a delay element, positioned at a selected angle greater than 0° with respect to at least one selected direction along which a position is to be measured. Means for determining the position along the distributed element are provided, e.g., a driver transducer and a receiver transducer relatively movable along the delay element by which the delay of a signal travelling along the delay element and, hence, the position therealong is determined. Means responsive to such position determination are further included for calculating from such position determination the position along the at least one selected direction. The invention is especially useful for multi-axis position determination wherein, for example, a single delay element can be positioned at a selected angle with respect to each of two axes, so that linear or angular position determination can be made with respect to each axis.

19 Claims, 6 Drawing Figures

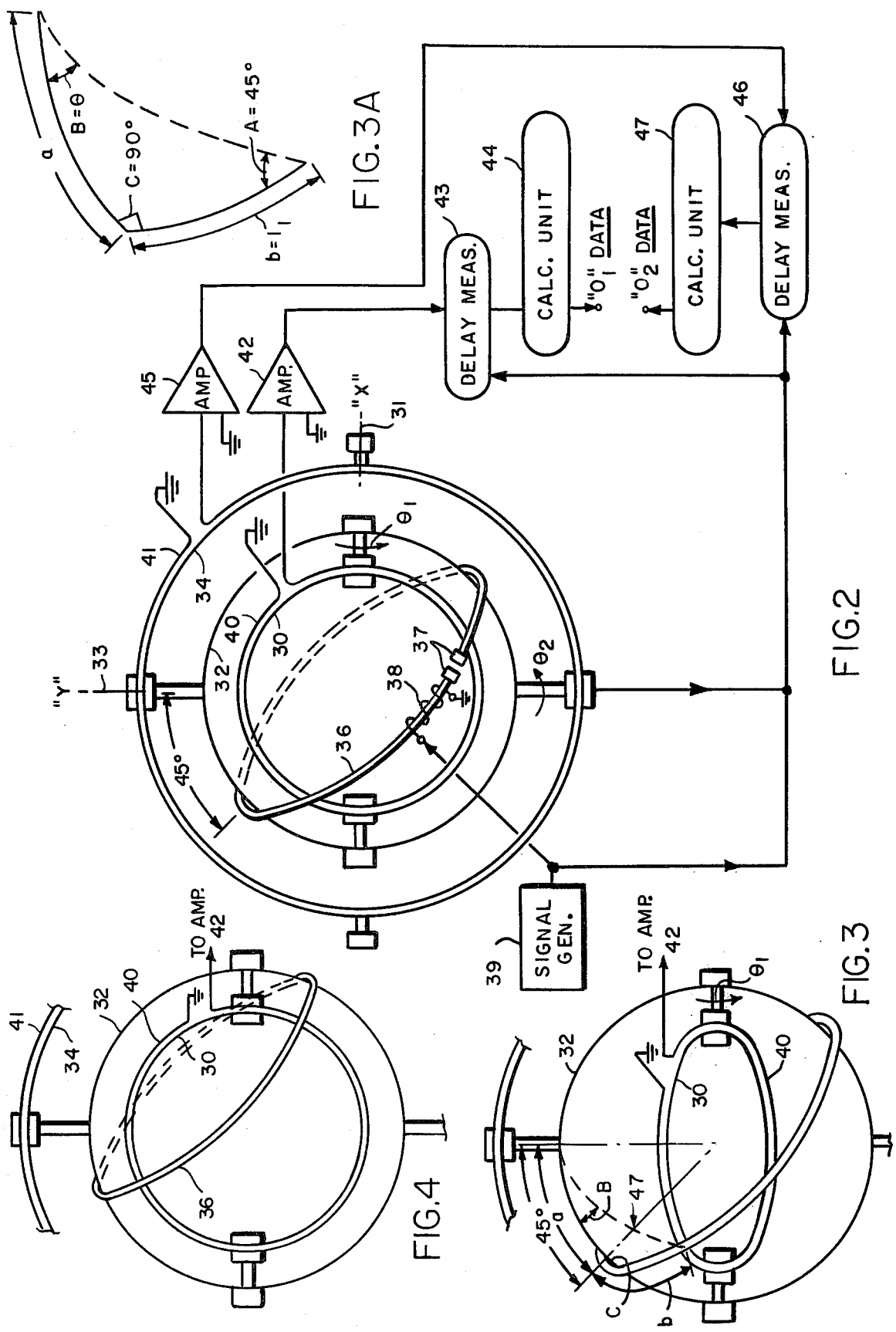

MULTI-AXIS POSITION DETERMINING SYSTEM

INTRODUCTION

This invention relates to position determining systems and, more particularly, to systems for making linear and angular position determinations in single degree of freedom, multi-axis systems.

BACKGROUND OF THE INVENTION

An effective approach to linear and angular position determining systems has been shown in my U.S. Pat. No. 4,035,762, issued on July 12, 1977. Such patent describes various embodiments for measuring a position along a line, either straight or curved, or on a plane or other curvilinear surface, with a high degree of accuracy at a reasonable cost. The embodiments described therein generally require two relatively movable members. In a particular embodiment one member may comprise a driver transducer and a delay line, both fixedly positioned, and a second member may comprise a receiver transducer which is movable with respect to the fixed driver transducer and the delay line. The resolution of the displacement measurement depends upon the phase shift experienced by a continuous elastic wave travelling once along a single delay line element in one direction only, parallel to, or coincident with, the distance to be measured. If position with respect to more than one axis is required, a plurality of such delay elements are used for such purpose.

It is desirable to reduce the number of delay elements in multi-axis systems in order to simplify the structure thereof as much as possible and to reduce the cost by requiring the use of fewer precision components while, at the same time, still providing high resolution. Moreover, in single-axis applications it is desirable to obtain much higher resolutions than presently available while still using the same components without changing either the frequency of the driver signal or the velocity of propagation in the delay medium.

BRIEF SUMMARY OF THE INVENTION

This invention provides advantages in multi-axis applications over that described in my above-mentioned, previously issued U.S. patent, which advantages are particularly gained for special multi-axis embodiments in which each degree of freedom is orthogonal to each other, the complexity and costs being considerably reduced by the shared use of at least one delay element in providing position determinations with respect to more than one axis. In each case, the shared delay element is positioned at a selected angle with respect to the direction for which a position determination is to be made. Thus, in providing for position determination with respect to two axes, a single delay element can be positioned at a selected angle with respect to each axis (e.g., the delay element may be positioned at a 45° angle with respect to each of two orthogonal axes), and linear or angular position determinations with respect to each axis can be obtained thereby.

DESCRIPTION OF THE INVENTION

Particular embodiments of the invention can be better understood in more detail with the help of the accompanying drawings wherein FIG. 1 shows an embodiment of the invention for determining a position with respect to a pair of orthogonal axes using a single delay element;

FIG. 2 shows an alternative embodiment of the invention for providing angular position determinations with respect to a multi-axis gimbal system;

FIG. 3 shows a portion of the embodiment of FIG. 2 in which the inner gimbal element has been rotated through an angle $\theta_1$.

FIG. 3A shows a geometric diagram helpful in understanding the operation of the system of FIGS. 2 and 3;

FIG. 4 shows an alternative embodiment of the system shown in FIG. 2; and

Figure 1:
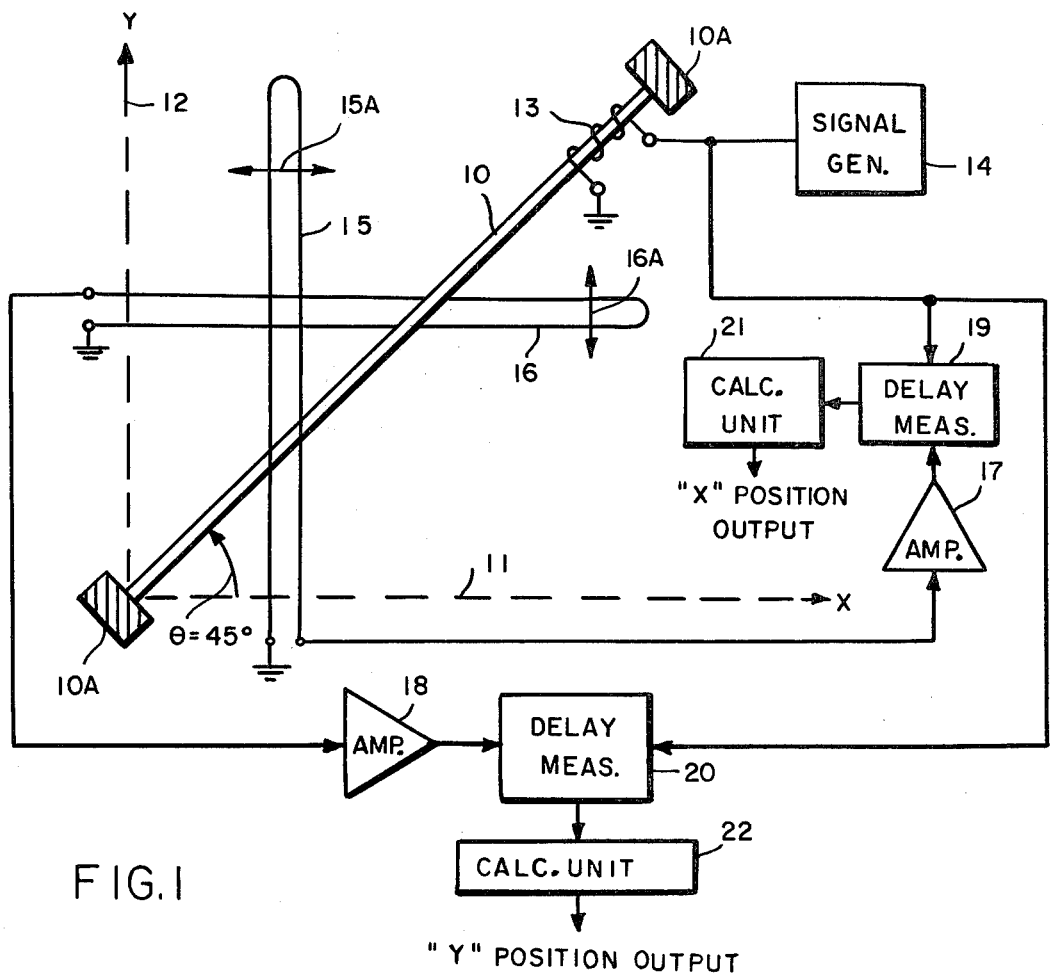

The embodiment of FIG. 1 can be utilized to provide position determination with respect to two axes utilizing only a single delay element. As seen therein, a single element in the form of a delay line 10 is utilized to provide position determinationss along two orthogonal axes identified as the "X" axis 11 and the "Y" axis 12. The delay line which may be, for example, a magnetostrictive delay line element of the type discussed in my above-mentioned U.S. patent is preferably positioned so that it is at a 45° angle with respect to each axis. When using such magnetostrictive delay line elements a magnetic bias is required, as is known to the art, such bias being produced by several techniques, as discussed in my aforementioned U.S. patent. Delay line element 10 has a damping element 10A mounted at each end for preventing reflections of signals thereat. A first driver transducer 13 is excited by a signal generator 14 so as to produce a signal which travels along delay line 10. A second receiver transducer 15 is arranged for movement along the X-axis direction as shown by double-headed arrow 15A and a third receiver transducer 16 is mounted for movement along the direction of the Y axis as shown by double-headed arrow 16A.

Transducers 15 and 16 are suitably mounted on mounting means (not shown) for movement along the X and Y directions, respectively, and may be in the form of an extended loop of wire, as shown, which moves along each direction adjacent delay line 10 in a manner so as to provide substantially the same coupling with the delay line throughout their entire movements.

A signal which travels along delay element 10 is picked up by each of the transducers 15 and 16 and suitably amplified by amplifiers 17 and 18, respectively, the amplified received signals thereupon being supplied to phase detectors 19 and 20, respectively. The phases thereof are compared to the phase of the signal from signal generator 14 so as to produce a measurement of the distance between each of said receiver transducers relative to the driver transducer 13 along delay line element 10.

As discussed more fully in my above-referred to U.S. Pat. No. 4,035,762, the position measurements when using continuous wave signals require both a "coarse" and a "fine" measurement, the coarse measurement determining the number of integral cycles of the C-W signal between the activated transducer 13 and the receiver transducers 15 and 16 so that a coarse determination of the approximate distance therebetween to within one cycle (i.e., one wavelength) is determined. The phase difference within such one wavelength thereupon provides the "fine" measurements of the overall distance between the driver and receiver transducers at a desired accuracy determined by the frequency of the C-W signal which is used. Since suitable techniques for providing such coarse and fine measurements are described in such previously issued patent, the details thereof need not be given here and, for simplicity, such coarse and fine measurements are represented by the delay measurement means 19 and 20 in FIG. 1 and also in subsequent figures herein.

The components thereof along the X-axis and Y-axis directions are thereupon appropriately calculated by the scale factor units 21 and 22, respectively, in each case the scale factor being the cosine of the angle between the delay line 10 and the corresponding axis involved. Where each angle is 45°, as here, the scale factor is $\sqrt{2}$. In general, where the X-axis angle is $\theta$ and the Y-axis angle is $\phi$, the scale factors are $\cos\theta$ and $\cos\phi$, respectively.

Accordingly, a single delay line element, appropriately positioned with respect to two angularly related directions, can be utilized to determine the positions along such directions. While the particular embodiment disclosed in FIG. 1 shows a position determining system with respect to two orthogonal axes, such directions need not be orthogonally related. Further, the signal which is supplied from signal generator 14 may be a continuous wave (C-W) signal for generating a C-W travelling wave along delay line element 10, or such signal can be a pulse signal in which case the delay which is measured is a time delay representing the time of travel of such pulse from the driver transducer 13 to the receiver transducers 15 and 16. In the latter case the phase detectors involved can be replaced by time detection measurement devices such as suitable counters, etc., well known to those in the art, the time measurement representing a direct measurement of distance so that no "coarse" and "fine" measurements need be made as in the phase measurement case.

Moreover, while the transducer 13 is utilized as the driver transducer in such embodiment and the transducers 15 and 16 as receiver transducers, such roles can be reversed and the driver signal can be applied to both the latter transducers and the transducer 13 utilized as the receiver transducer. In the latter case, for example, appropriate multiplexing techniques can be utilized for determining the positions along each of the two axes, such measurements being made at different times utilizing the same delay line element 10.

The concepts discussed above relative to the measurement of linear distances in FIG. 1 are also applicable to the measurement of angular relationships. Such angular determinations may be utilized, for example, in multi-axis gimbal systems wherein the angular relationships between gimbal elements are to be made. Such gimbal systems are utilized, for example, in inertial guidance and control systems wherein gimbal angle readouts are essential for providing the desired control signals therein. In presently used gimbal inertial measurement systems, several gimbal angular readout elements are required, all of which add to the complexity and cost of the overall system. A gimbal system utilizing the concepts of the invention, however, can reduce such cost and complexity by eliminating the number of angle sensors which are normally required therefor.

An embodiment of the invention is applied to a simple gimbal system for measuring the angular relationship between a stabilized gimbal element and each of two other gimbal elements which move angularly with respect thereto is shown diagrammatically in FIG. 2. As seen therein, a first inner gimbal element 30 rotates about a first ("X") axis 31, shown as horizontal in the figure, a second middle gimbal 32 assumes a stable position as shown, and a third outer gimbal element 34 rotates about a second ("Y") axis 33, shown as vertical and orthogonal to axis 31. While such gimbal elements are often in the form of spheres, for simplicity they are depicted only diagrammatically in the planar drawing of FIG. 2. In operation, it is desirable to determine the angular relationship between the first inner and second middle gimbal elements 30 and 32, respectively, identified by the angle $\theta_1$, and the angular relationship between the second middle and third outer gimbal elements 32 and 34, respectively, identified by the angle $\theta_2$.

In accordance with the invention, a delay element 36 is fixedly mounted on the middle gimbal element 32 at a selected angle with respect to the vertical axis of rotation 33 (in the case shown the angle is selected as 45°). The delay element 36 may be in the form of a circular delay line having a pair of damping elements 37 at the ends thereof. A transducer 38 which may be, for example, a coil of wire is coupled to the delay line element 36 adjacent one end thereof. Transducer 38 in the embodiment shown in FIG. 2 may be utilized as a driver transducer for producing a travelling signal in delay element 36 when appropriately excited from a signal generator 39, substantially in the same manner as discussed above with reference to FIG. 1.

A second transducer in the form of a wire loop 40 is mounted on the outer surface of inner gimbal element 30. Transducer 40 in the embodiment shown is utilized as a receiver transducer, one end of which is connected to ground and the other of which provides a receiver signal when the travelling signal and delay line element 36 pass by transducer loop 40. A second receiver transducer 41 is mounted as shown on the outer surface of outer gimbal element 34, one end of transducer 41 being connected to ground and the other end providing a receiver signal when the travelling signal and delay element 36 pass by transducer loop 41. In order to determine the angular relationship $\theta_1$, for example, between the inner gimbal element 30 and middle gimbal element 32, transducer 38 is excited with a continuous wave signal, for example, and such signal is picked up by transducer 40 and supplied to amplifier 42. The input signal from signal generator 39 and the amplifier received signal are applied to a phase detector 43 in substantially the same manner as discussed above with reference to FIG. 1. The phase difference therebetween represents a measurement of the distance along delay line 36 from the midde gimbal element 32 to the inner gimbal element 30 which is rotated with respect thereto. The output from phase detector 43 is supplied to calculation unit 44 to provide a determination of the angle $\theta_1$ in accordance with the appropriate spherical trigonometric relations involved.

In order to understand the trigonometric calculations involved, FIG. 3 shows middle gimbal 32 and inner gimbal 30 rotated with respect thereto at an angle $\theta_1$. A spherical triangle 47 is thereby formed having two sides, "a" (equivalent to the 45° distance which delay line 36 makes with the vertical axis 33) and "b" (the distance travelled by the travelling wave along delay line 36 to where it is picked up by receiver transducer 40). The spherical angle at B represents the angle $\theta_1$ to be measured and the spherical angle at C is 90°. Accordingly, the following known general spherical trigonometric relationship holds:

$$\tan b = \tan B \sin a$$

Such expression can be rewritten to solve for B as follows:

$$B = \tan^{-1} [\tan b / \sin a]$$

In the particular case where a is equal to 45°, as shown in FIG. 3, the relationship reduces to $$B = \tan^{-1} [\sqrt{2} \tan b]$$

In FIG. 3 where the angle B is the desired angle $\theta_1$ and b is the distance $l_1$ along delay line 36, the above relationship becomes $$\theta_1 = \tan^{-1} [\sqrt{2} \tan l_1]$$

For clarity in understanding the spherical triangular relationships set forth above, the spherical triangle is reproduced in FIG. 3A, the sides a and b (where $b=l_1$) and the angles A,B (where $B=\theta_1$) and C being suitable identified.

Such calculation can then be made by calculation unit 44 once the distance $l_1$ (in degrees) along delay line 36 is determined by phase detector 43.

In a similar manner the angle between middle gimbal element 32 and outer gimbal element 34 can be determined in accordance with the phase difference between the signal applied to driver transducer 38 from signal generator 39 and the signal which is received at transducer 41, appropriately amplified by amplifier 45, both of such signals being supplied to phase detector 46 and thereupon to calculation unit 47 to determine the angle $\theta_2$.

Thus, a single delay line element appropriately mounted on a middle gimbal element at a preselected angle (for simplicity the angle has been selected in FIG. 2 as 45°, although not limited thereto) permits a measurement of the angular relationships between an inner gimbal element and such middle gimbal element as well as between an outer gimbal element and such middle gimbal element, without the need for two separate angle sensors and readout units as is normally required in such a gimbal structure.

While the signal applied to driver transducer 38 has been discussed as a continuous wave signal, such signal can also be a pulse signal and the angular measurements can be determined by measuring the time delays between the signal produced at transducer 38 and the signals picked up at transducers 40 and 41, such time delays and the polarities of the received signals appropriately indicating the gimbal angles.

While the dual gimbal angle system of FIG. 2 is shown as used in connection with a two degree of freedom, three gimbal element system, such concept can be extended to a higher degree of freedom system having more than three such gimbal elements, in each case a single delay element on a selected gimbal element being used to determine angular relations with respect to adjacent inner and outer gimbal elements. Such a system as may be conventionally used in many applications could comprise, for example, one stabilized gimbal element and four rotating gimbal elements. In cases where more than one delay element is required to determine the angular relationships in a system using four or more gimbal elements, separate signal generators can be used to excite each of the driver transducers involved and the received signals can be supplied directly to appropriate phase detectors and calculation units. Alternatively, only a single signal generator need be used and the signal therefrom supplied to the driver transducers in a multiplexed fashion, the received outputs also being correspondingly multiplexed using well-known multiplexing techniques.

Although the embodiment of FIG. 2 shows the delay line element 36 supported on gimbal element 32 in a manner such as to coincide with the great circle thereof, the delay line element can be mounted so as to be off the great circle as shown in FIG. 4, the necessary spherical trigonometric relationships being calculated in substantially the same manner as discussed above.

Figure 5:
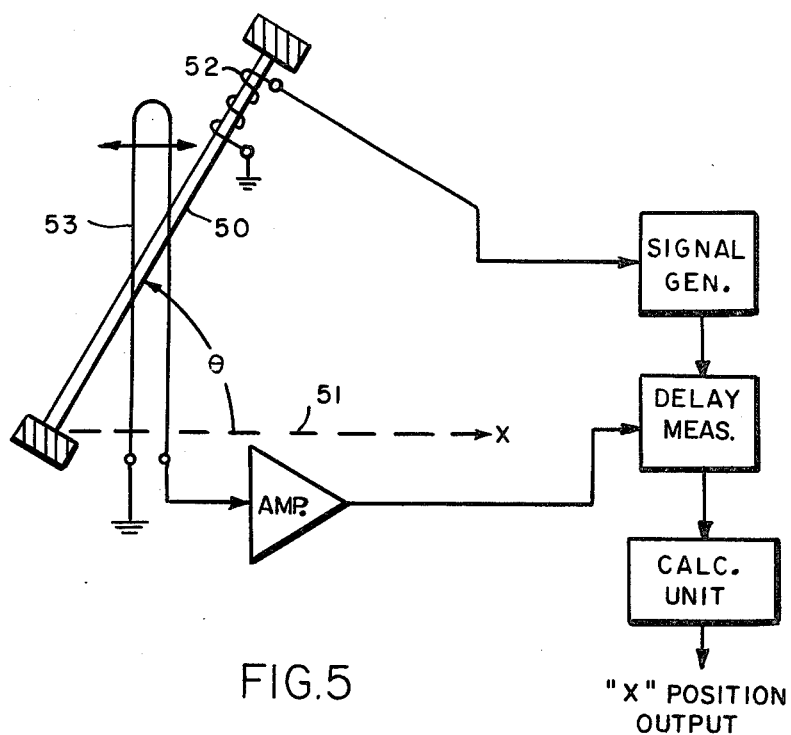
FIG. 5 shows an embodiment of the invention for improving resolution in a single axis position determination system.

While the use of a delay line element which lies at an angle with respect to the distance being measured along an axis, as opposed to lying along the direction of the axis itself, has been discussed in a multi-axis configuration with respect to FIG. 1 such concept can also be used to improve the resolution in a single-axis configuration as shown in FIG. 5. As seen therein, a delay element 50 is fixedly mounted with respect to a selected axis direction 51 identified as the "X" direction at a selected angle $\theta$. A driver transducer 52 is fixedly mounted on delay line 50 and a receiver transducer 53 is mounted for movement along the "X" direction and may be in the form of an extended loop of wire, as also shown in FIG. 1, so as to provide substantial coupling with the delay line 50 throughout its entire movement.

The distance along the "X" direction can be determined in the same manner as discussed above in connection with FIG. 1. Because the delay line is positioned at a selected angle $\theta$ with reference to the "X" direction, the resolution of the measurement involved is improved over that obtained when the delay line lies along the "X" direction since the component of the distance between transducers 52 and 53 along the "X" direction is represented by a much longer distance along the delay line itself (depending on the selected value of $\theta$) where the phase shift (or time shift if pulses are used) measurements are made. The resolution improvement is greater the greater the selected value of $\theta$.

While the invention is discussed above in connection with the use of delay elements for position determinations, the fundamental concept thereof can also be useful in measurement systems using other distributed sensing elements. Thus, a potentiometer, for example, uses a distributed resistance element having a movable contact element coupled thereto, the varying resistance at the contact providing a determination of its position along the distributed resistance. In conventional potentiometers the distributed resistance is arranged to be aligned with the direction, either linear or curvilinear, along which a position is to be determined.

In accordance with the invention, a single distributed sensing means (e.g., a distributed resistance element), is positioned at a selected angle with respect to one or more selected directions along which a position is to be determined. One or more movable elements are coupled to the distributed element and move with respect thereto along the one or more selected directions. The outputs at the one or more coupled elements determine the position along the distributed means and from the known selected angle a determination can then be made of the position along the one or more selected directions with a much higher degree of resolution than in conventional devices of this type.

Other modifications and uses of the invention will occur to those in the art within the spirit and scope of the invention and the invention is not to be deemed limited to the particular embodiments disclosed herein except as defined by the appended claims.

What is claimed is:

1. A position determining device comprising
    delay means mounted at a selected angle greater than 0° with reference to at least one selected direction along which said position is to be determined;
    first transducer means fixedly coupled to said delay means;
    second transducer means coupled to said delay means and relatively movable with respect to said delay means so as to maintain substantially the same coupling with said delay means throughout its movement;
    means for activating one of said first and second transducer means to generate a signal which travels along said delay means, the other of said first and second transducer means detecting said travelling signal as it travels past said other transducer means;
    means for determining the delay of said signal as it travels from the activated transducer means to the detecting transducer means whereby the position of said detecting transducer means relative to said activated transducer means along said delay means is determined; and
    means responsive to said delay determination for calculating the position of said detecting transducer means relative to said activated transducer means along said at least one selected direction.

2. A device in accordance with claim 1 wherein said activating means generates a continuous wave signal which travels along said delay means and said delay determining means determines the delay of said travelling signal in accordance with the phase difference between the signal generated at said activated transducer means and the signal detected by said detecting transducer means.

3. A device in accordance with claim 1 wherein said activating means generates a pulse signal which travels along said delay means and said delay determining means determines the delay of said signal in accordance with the time of travel of said pulse signal from said activated transducer means to said detecting transducer means.

4. A device in accordance with claim 1 wherein said delay means is a straight line delay element mounted at selected angles with reference to each of two selected straight line directions.

5. A device in accordance with claim 4 wherein said two selected straight line directions are orthogonal.

6. A device in accordance with claim 5 wherein said selected angles are each equal to 45°.

7. A device in accordance with claim 1 wherein said delay means is a curvilinear delay element.

8. A device for determining at least one angular position comprising
    at least three movable elements, each angularly movable with respect to each other about a different axis, each of said different axes having a fixed angular relation to at least two others of said different axes, a circular delay element fixedly mounted on at least one of said at least three movable elements at a position in a plane which is at a selected angle with reference to the axis associated therewith;
    driver transducer means fixedly coupled to said delay element;
    receiver transducer means fixedly mounted on said at least two others of said at least three movable elements adjacent said at least one movable element, each of said receiver transducer means being coupled to said delay element and being relatively movable with respect thereto so as to maintain substantially the same coupling with said delay element throughout its movement;
    means for activating said driver transducer means to generate a signal which travels along said delay element, said receiver transducer means detecting said travelling signal as it travels past each of said receiver transducer means;
    means for determining the delay of said signal as it travels from said driver transducer means to each of said detecting receiver transducer means whereby the position of said detecting receiver transducer means relative to said driver transducer means along said delay element is determined; and
    means responsive to said delay determinations for calculating the angular position of said at least two others of said at least three movable elements with respect to said at least one movable element.

9. A device in accordance with claim 8 wherein said different axes are orthogonally positioned with respect to each other.

10. A device in accordance with claim 9 wherein said driver transducer means generates a continuous wave signal which travels along said delay element and said delay determining means determines the delay of said travelling signal in accordance with the phase difference between the signal generated at said driver transducer means and the signals detected by said detecting receiver transducer means.

11. A device in accordance with claim 8 wherein said driver transducer means generates a pulse signal which travels along said delay element and said delay determining means determines the delay of said signal in accordance with the times of travel of said pulse signal from said driver transducer means to said detecting receiver transducer means.

12. A device for determining angular positions comprising
    three movable gimbal elements each angularly movable with respect to each other about one of three different axes which are orthogonally positioned with respect to each other, said gimbal elements forming an assembly thereof comprising an inner gimbal element, a middle gimbal element, and an outer gimbal element;
    a circular delay element fixedly mounted on said middle gimbal element at a selected angle with reference to the axis associated therewith;
    driver transducer means fixedly coupled to said delay element;
    first receiver transducer means fixedly mounted on said inner gimbal element, said first receiver transducer means being coupled to said delay element and being relatively movable with respect thereto so as to maintain substantially the same coupling with said delay element throughout its movement;
    second receiver transducer means fixedly mounted on said outer gimbal element, said second receiver transducer means being coupled to said delay element and being relatively movable with respect thereto so as to maintain substantially the same coupling with said delay element throughout its movement;
    means for activating said driver transducer means to generate a signal which travels along said delay element, said first and second receiver transducer means each detecting said travelling signal as it travels past said first and second receiver transducer means;

means for determining the delay of said signal as it travels from said driver transducer means to each of said first and second receiver transducer means whereby the positions of said first and second receiver transducer means relative to said driver transducer means along said delay element are determined; and means responsive to said delay determinations for calculating the angular positions of said inner and outer gimbal elements with respect to said middle gimbal element.

13. A device in accordance with claim 12 wherein said driver transducer means generates a continuous wave signal which travels along said delay element and said delay determining means determines the delays of said travelling signal in accordance with the phase differences between the signal generated at said driver transducer means and the signals detected by said first and second receiver transducer means.

14. A device in accordance with claim 12 wherein said driver transducer means generates a pulse signal which travels along said delay element and said delay determining means determines the delays of said signal in accordance with the times of travel of said pulse signal from said driver transducer means to each of said first and second receiver transducer means.

15. A device in accordance with claim 12 wherein said circular delay element is fixedly mounted on said middle gimbal in a manner so as to coincide with the great circle of said middle gimbal element.

16. A device in accordance with claim 12 wherein said circular delay element is fixedly mounted at a position which does not coincide with the great circle of said gimbal element.

17. A device in accordance with claim 16 wherein said driver transducer means generates a continuous wave signal which travels along said delay element and said delay determining means determines the delays of said travelling signal in accordance with the phase differences between the signal generated at said driver transducer means and the signals detected by said first and second receiver transducer means.

18. A device in accordance with claim 16 wherein said driver transducer means generates a pulse signal which travels along said delay element and said delay determining means determines the delays of said signal in accordance with the times of travel of said pulse signal from said driver transducer means to said first and second receiver transducer means.

19. A position determining device comprising a distributed position sensor means mounted at a selected angle greater than 0° with reference to at least one selected direction along which said position is to be determined;

means for activating said distributed position sensor means to provide a signal which is a function of the position along said distributed position sensor means;

at least one movable means coupled to said position sensor means and relatively movable with respect thereto, said movable means having at least one component of motion along said at least one direction so as to maintain substantially the same coupling therewith throughout its movement, said at least one movable means being responsive to said signal for providing an output representing its position along said position sensor means; and means responsive to said output for calculating the position of said movable means along said at least one selected direction.

* * * * *